United States Patent [19]

Shibata et al.

[11] Patent Number: 6,146,473
[45] Date of Patent: Nov. 14, 2000

[54] METAL SURFACE TREATMENT COMPOSITION CONTAINING AN ACRYLIC RESIN COMPRISING A N-HETEROCYCLE RING, TREATMENT METHOD, AND TREATED METAL MATERIAL

[75] Inventors: Yasuhiro Shibata, Yokohama; Tomoyuki Kanda, Kamakura; Atsuhiko Tounaka, Yokohama; Susumu Maekawa, Yamato; Kiyotada Yasuhara, Kashiwa, all of Japan

[73] Assignee: Nippon Paint Co., Ltd., Osaka, Japan

[21] Appl. No.: 09/284,283

[22] PCT Filed: Oct. 13, 1997

[86] PCT No.: PCT/JP97/03657

§ 371 Date: Apr. 12, 1999

§ 102(e) Date: Apr. 12, 1999

[87] PCT Pub. No.: WO98/17736

PCT Pub. Date: Apr. 30, 1998

[30] Foreign Application Priority Data

Oct. 21, 1996 [JP] Japan ................................. 8-278367
Sep. 30, 1997 [JP] Japan ................................. 9-266063

[51] Int. Cl.⁷ .................................................. C23C 22/00
[52] U.S. Cl. ........................ 148/251; 148/275; 106/14.17
[58] Field of Search .................................... 148/251, 259, 148/274, 275; 106/14.16, 14.17

[56] References Cited

U.S. PATENT DOCUMENTS

| 4,783,224 | 11/1988 | Sako et al. | |
|---|---|---|---|
| 4,963,596 | 10/1990 | Lindert et al. | 526/313 |
| 5,110,494 | 5/1992 | Beck | 252/156 |
| 5,584,943 | 12/1996 | Banaszak et al. | 148/246 |
| 5,728,234 | 3/1998 | Aoki et al. | 148/251 |

FOREIGN PATENT DOCUMENTS

| 3744032 A1 | 7/1988 | Germany . |
|---|---|---|
| 51-73938 | 6/1976 | Japan . |
| 53-125437 | 11/1978 | Japan . |
| 59-232191 | 12/1984 | Japan . |
| 62-280285 | 12/1987 | Japan . |
| 63-171683 | 7/1988 | Japan . |
| 63-171684 | 7/1988 | Japan . |
| 5-117869 | 5/1993 | Japan . |
| 6-146002 | 5/1994 | Japan . |

*Primary Examiner*—John Sheehan
*Assistant Examiner*—Andrew L. Oltmans
*Attorney, Agent, or Firm*—Oliff & Berridge, PLC

[57] ABSTRACT

A metal surface treatment composition which can improve the corrosion resistance and the tight adhesion to coating films and impart slipperiness. The composition is an aqueous solution, dispersion or emulsion containing both an acrylic resin having nitrogenous heterocycles, amino and/or ammonium groups and hydrophobic groups and a heavy metal or a salt thereof. The amino or ammonium groups have at least one structure selected from among those represented by general formulae (I) (wherein in $R_1$, $R_2$: hydrogen, hydroxyl, substituted or unsubstituted, linear or branched $C_1$–$C_5$ alkyl, or substituted or unsubstituted, linear or branched $C_1$–$C_5$ hydroxyalkyl) and (II) (wherein $R_3$, $R_4$, $R_5$: hydrogen, hydroxyl, substituted or unsubstituted, linear or branched $C_1$–$C_5$ alkyl, or substituted or unsubstituted, linear or branched $C_1$–$C_5$ hydroxyalkyl).

25 Claims, No Drawings

METAL SURFACE TREATMENT COMPOSITION CONTAINING AN ACRYLIC RESIN COMPRISING A N-HETEROCYCLE RING, TREATMENT METHOD, AND TREATED METAL MATERIAL

BACKGROUND OF THE INVENTION

1. Field of the Invention

This invention relates to a metal surface treatment composition containing an acrylic resin comprising a N-heterocyclic ring, treatment method and treated metal material, and in particular to a metal surface treatment composition containing an acrylic resin comprising a N-heterocyclic ring, treatment method and treated metal material giving improved corrosion resistance, film adhesion and slip properties (referred to also as "lubricity").

2. Description of Related Art

Conventionally, phosphate treatment, chromate treatment and non-chromate treatment, etc. were performed as surface treatments for food cans, car bodies, coil coatings for steel plate and metals for construction materials. For example, a phosphate film is formed on a metal surface as a pretreatment when organic coatings such as paints and adhesives are applied to metal surfaces such as iron, zinc, and aluminum. By subsequently applying an organic film such as a coating, corrosion resistance and film adhesion can be improved. However, conventional phosphate treatment did not necessarily provide sufficient corrosion resistance, film adhesion or slip properties to satisfy demand in recent years.

To improve corrosion resistance following phosphate treatment, it was common to apply a coating after first applying a primer coat. However, if a primer was first applied, although corrosion resistance and film adhesion improved, the number of coating steps increased, complicating the procedure and leading to higher cost.

"A Metal Surface Treatment for Composite Films" of Japanese Patent Laid-open publication No. Hei 5-117869 was proposed for example as a metal surface treatment which aims to omit the primer coating while giving highly developed corrosion resistance and film adhesion. The metal surface treatment of the aforesaid Japanese Patent Laid-open publication No. Hei 5-117869 is a phosphate surface treatment liquid comprising a cationic organic polymer compound or one of its salts having one or more cationic nitrogen atoms, and a molecular weight in the range of 1,000–1,000,000.

In the "Surface Treatment Method for Aluminum and Aluminum Alloys" described in Japanese Patent Laid-open publication No. Sho 51-73938, the metal to be treated is limited to aluminum. This method aims to confer corrosion resistance and film adhesion properties. It is described that this metal surface treatment method uses a liquid of which the principal components are water-soluble resins such as vinyl acetate, vinylidene chloride and acrylic acid or organic polymer film forming substances comprising emulsion resins, and a water-soluble titanium compound.

However, although they offer improved corrosion resistance and film adhesion compared with the prior art, neither the aforesaid metal surface treatment agent nor treatment method has reached recent demand requirements. In particular, in the manufacture of food cans using aluminum or its alloys, they do not prevent jamming, and in the coil coating of steel plate, lubricity is poor.

SUMMARY OF THE INVENTION

It is therefore an object of this invention to provide a metal surface treatment composition containing an acrylic resin comprising a N-heterocyclic ring, treatment method and treated metal material offering improved corrosion resistance, film adhesion and slip properties.

To achieve this object, the metal surface treatment composition containing an acrylic resin comprising a N-heterocyclic ring according to this invention comprises: a) a water-soluble, water-dispersible or emulsifiable acrylic resin comprising a heterocyclic ring containing a nitrogen atom, either an amino group or an ammonium group or both, together with a hydrophobic group, and b) a heavy metal or one of its salts.

As permeability is suppressed by an inorganic film which comprises a heavy metal or one of its salts, corrosion resistance improves. Further, as the nitrogen atoms in the acrylic resin comprising a N-heterocyclic ring and amino group (ammonium group) are coordinated with the (heavy) metal, the aforesaid inorganic film is connected via the acrylic resin. This prevents cohesive failure of the inorganic film, giving an almost uniform substrate film on the metal surface which improves adhesion between the substrate film and the topcoat. The substrate film of this invention refers to the film formed on the metal surface which comprises the aforesaid inorganic film connected by the acrylic resin. In addition, the aforesaid acrylic resin is almost uniformly distributed on the substrate film surface, so frictional resistance is reduced and slip properties are improved.

Preferably, the amino group or the ammonium group in the metal surface treatment composition containing an acrylic resin comprising a N-heterocyclic ring according to this invention comprises at least the structural unit represented by the following chemical formulae (I) or (II).

where $R_1$, $R_2$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms

where $R_3$, $R_4$, $R_5$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms.

In the metal surface treatment composition containing an acrylic resin comprising a N-heterocyclic ring, the amino group or ammonium group contained in the acrylic resin is introduced by copolymerization of a monomer comprising at least the structural unit represented by the following chemical formulae (III) and (IV).

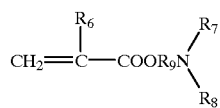

(III)

where $R_6$ is hydrogen or methyl, $R_7$, $R_8$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, and $R_9$ is an alkylene group comprising 1–5 carbon atoms.

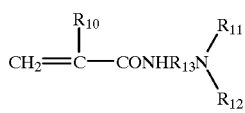

(IV)

where $R_{10}$ are hydrogen or methyl, $R_{11}$, $R_{12}$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, and $R_{13}$ is an alkylene group comprising 1–5 carbon atoms.

In the metal surface treatment composition containing an acrylic resin comprising a N-heterocyclic ring according to this invention, the hydrophobic group contained in the acrylic resin is introduced by copolymerization of a monomer comprising at least the structural unit represented by the following chemical formula (V).

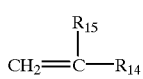

(V)

where $R_{14}$ is —$COOR_{16}$, or a substituted or unsubstituted phenyl group, $R_{15}$ is hydrogen or methyl $R_{16}$ is a straight chain, branched or cyclic alkyl group comprising 4–18 carbon atoms.

In the metal surface treatment composition containing an acrylic resin comprising a N-heterocyclic ring, the acrylic resin is preferably obtained by copolymerization of at least one compound selected from acidic monomers comprising acrylic acid and methacrylic acid, and multi-functional cross-linked monomers.

Moreover, the molecular weight of the acrylic resin in this invention is 500–100,000, and preferably 1,000–20,000. When the molecular weight is less than 500, corrosion resistance decreases. On the other hand, when the molecular weight exceeds 100,000, hydrophilic properties decrease.

According to this invention, the acrylic resin content is 0.01–10 g/l and preferably 0.1–5 g/l relative to the metal surface treatment composition containing an acrylic resin comprising a N-heterocyclic ring. When the acrylic resin content is less than 0.01 g/l, a binder effect is not manifested, and the physical durability of the substrate film decreases. On the other hand, when the acrylic resin content exceeds 10 g/l, the adhesion between the substrate film and the metal surface decreases.

In the acrylic resin of the metal surface treatment composition containing an acrylic resin comprising a N-heterocyclic ring of this invention, copolymers of the following monomers are suitable. Specifically, (1) The monomer containing a N-heterocyclic ring may for example be N-vinylpyrrolidine, vinyl pyridine, N-vinyl imidazole, N-vinyl caprolactam, vinyl oxazoline, N-vinyl oxazolidone or acroyl morpholine.

(2) The acrylic monomer containing an amino group (ammonium group) may for example be N,N-dimethylaminoethyl(meth)acrylate, N,N-diethylaminoethyl(meth)acrylate, (meth)acrylamide, N,N-dimethylacrylamide, N-methylolacrylamide, N-methylaminopropyl(meth)acrylamide, N,N-dimethylaminopropyl(meth)acrylamide, N-ethylamino propyl(meth)acrylamide, N,N-diethylaminopropyl (meth) acrylamide, or chlorides of these compounds.

(3) The monomer containing a hydrophobic group may for example be n-butyl(meth)acrylate, i-butyl(meth)acrylate, t-butyl(meth)acrylate, n-hexyl(meth)acrylate, 2-ethylhexyl(meth)acrylate, lauryl (meth)acrylate, stearyl (meth)acrylate, cyclohexyl(meth)acrylate, isobornyl (meth)acrylate, styrene, p-t-butylstyrene, vinyltoluene, vinylphenol or benzyl(meth)acrylate.

(4) Additionally, other acrylic monomers which may be added are acrylic acid and methacrylic acid which are acid monomers, ethylene glycol dimethacrylate, diethylene glycol dimethacrylate, 1,4-butanediol dimethacrylate, neopentyl glycol dimethacrylate, glycerine dimethacrylate, 1,6-hexanediol dimethacrylate and trimethylolpropane triacrylate which are polyfunctional cross-linking monomers, 2-hydroxyethyl(meth)acrylate, hydroxypropyl (meth)acrylate, and 4-hydroxydibutyl (meth)acrylate.

The copolymerization ratios of copolymers formed from the aforesaid monomers are amino group (ammonium group)-containing acrylic monomer 5–60 weight %, N-heterocyclic ring-containing acrylic monomer 20–80 weight %, hydrophobic group-containing monomer 5–50 weight %, and other monomers 0–60 weight %.

More preferably, these ratios are amino group (ammonium group)-containing acrylic monomer 20–40 weight %, N-heterocyclic ring-containing acrylic monomer 30–60 weight % and hydrophobic group-containing monomer 20–40 weight %.

When further monomer except the aforesaid monomer add in the copolymers, the copolymerization ratios of copolymers are acid monomers 1–5 weight %, preferably 10–40 weight, multifunctional cross-linking monomer 1–10 weight %.

When the copolymerization ratio of monomer containing a N-heterocyclic ring in the aforesaid copolymer is less than 20 weight %, hydrophilic properties, film adhesion and adhesion to metals decrease. On the other hand, when the copolymerization ratio of monomer containing a N-heterocyclic ring in the aforesaid copolymer exceeds 80 weight %, corrosion resistance decreases.

When the copolymerization ratio of the amino group (ammonium group)-containing acrylic monomer in the aforesaid copolymer is less than 5 weight %, hydrophilic properties decrease, and the connectivity of the acrylic resin and inorganic film comprising the heavy metal or salt decreases. On the other hand, when the copolymerization ratio of the amino group (ammonium group)-containing acrylic monomer in the aforesaid copolymer exceeds 60 weight %, corrosion resistance decreases.

When the copolymerization ratio of the hydrophobic group-containing monomer in the aforesaid copolymer is less than 5 weight %, slip properties and corrosion resistance decrease. On the other hand, when the copolymerization ratio of the hydrophobic group-containing monomer in the aforesaid copolymer exceeds 50 weight %, hydrophilic properties and film adhesion decrease.

Heavy Metals

In the metal surface treatment composition containing an acrylic resin according to this invention, the heavy metal is at least one of the metals zirconium (Zr), molybdenum (Mo), tungsten (W), niobium (Nb), nickel (Ni), cobalt (Co), manganese (Mn) and tantalum (Ta). The source of the aforesaid heavy metal is preferably a complex fluoride of the heavy metal, other examples being a nitrate or phosphate.

The content of the complex fluoride of the heavy metal is preferably 0.01–10 g/l relative to the metal surface treatment composition containing an acrylic resin comprising a N-heterocyclic ring of this invention. When the content of the complex fluoride of the heavy metal is less than 0.01 g/l, corrosion resistance decreases. On the other hand, when the content of the complex fluoride of the heavy metal exceeds 10 g/l, corrosion resistance again decreases.

The metal surface treatment composition containing an acrylic resin comprising a N-heterocyclic ring according to this invention may also contain a phosphoric acid or phosphate. Examples of the phosphoric acid or phosphate are $H_3PO_4$, $Na_3PO_4$, $Na_2HPO_4$, $NaH_2PO_4$ and $(NH_4)_3PO_4$.

The content of the phosphoric acid or phosphate is 0.01–20 g/l, preferably 0.05–0.1 g/l, relative to the aforesaid metal surface treatment composition containing an acrylic resin comprising a N-heterocyclic ring. When the phosphoric acid or phosphate content is less than 0.01 g/l, corrosion resistance decreases. When the phosphoric acid or phosphate content exceeds 20 g/l, film adhesion decreases.

The metal surface treatment composition containing an acrylic resin comprising a N-heterocyclic ring according to this invention may also contain the following etchants and etching assistants optionally.

Etchants

As etchant, hydrogen fluoride or one of its salts may be used. The etchant content may be 0.005–0.5 g/l relative to the metal surface treatment composition. When the etchant content is less than 0.005 g/l, etching is insufficient, and the substrate film is not sufficiently formed on the metal surface. On the other hand, when the etching content exceeds 0.5 g/l, etching is excessive.

Etching Assistants

As etching assistants, hydrogen peroxide ($H_2O_2$), nitrous acid ($HNO_2$) or $HBF_4$, or a salt of one of these acids may be used. The etching assistant content may be 0.005–5 g/l of hydrogen peroxide ($H_2O_2$), nitrous acid ($HNO_2$) or nitrous acid salt relative to the metal surface treatment composition. When this content is less than 0.005 g/l, corrosion resistance decreases. On the other hand, even if the content exceeds 5 g/l, corrosion resistance decreases. Moreover, it is preferable that the content of $HBF_4$ or $HBF_4$ salt is 0.003–0.2 g/l relative to the metal surface treatment composition. When this content is less than 0.003 g/l, corrosion resistance decreases. On the other hand, even if the content exceeds 0.2 g/l, corrosion resistance decreases.

Operating Conditions and Treatment Method

In the metal surface treatment method according to this invention, the aforesaid metal surface treatment composition containing an acrylic resin comprising a N-heterocyclic ring is brought in contact with a metal surface, and the surface is then rinsed in water and dried. The pH of the aforesaid metal surface treatment composition is approximately 2.0–5.0, but preferably 2.5–3.5. The adjustment of pH is performed by NaOH, aqueous ammonia or nitric acid. The contact temperature of the metal surface treatment composition and metal material of this invention is normal temperature (e.g. 20° C.)–90° C., and preferably 35–65° C. In general, the contact time of metal material and the metal surface treatment composition containing an acrylic resin comprising a N-heterocyclic ring according to this invention is shorter the higher the contact temperature.

When the composition of this invention is sprayed on the metal material, it is usual to make contact for approximately 5 seconds–5 minutes, preferably for 10–60 seconds. When the di is used, a longer contact time than the aforesaid contact time is required. Additionally, contact can be made by the flow coat method and the roll coat method.

The metal material to which the surface treatment is given as aforesaid is rinsed in water, and enters a drying step. The drying temperature is 150–240° C., and at less than 150° C., corrosion resistance decreases.

The surface-treated metal material according to this invention is characterized by the fact that it is surface-treated using the aforesaid metal surface treatment composition containing an acrylic resin comprising a N-heterocyclic ring.

DETAILED DESCRIPTION OF THE PREFERRED EMBODIMENTS

Next, this invention will be described in more detail referring to the examples and comparative examples.

EXAMPLES 1–11 AND COMPARATIVE EXAMPLES 1–3

(1) Object to be Treated:

Molded can obtained by DI processing of an Al-Mn (JIS-A3004) aluminum alloy plate.

(2) Surface Treatment Film Evaluation Method:

Blackening on contact with boiling water refers to blackening which occurs in food cans (aluminum cans) when uncoated parts of the material react with metals present in water upon treatment with boiling tap water for sterilization purposes.

a) Tolerance to Blackening on Contact with Boiling Water:

The external appearance of a metal material which had been surface-treated with a composition according to these examples or the comparative examples and dipped in boiling tap water for 30 minutes, was evaluated according to the following criteria.

◯: No change in external appearance

Δ: Slight blackening

X: Blackening b) Slip Properties of Surface Treatment Film:

The coefficient of dynamic friction of a metal material which had been surface-treated by the method of this invention was found by a "HEIDON-14" apparatus using 5 mm dia. steel balls, load 50 g and stylus speed 300 mm/min.

◯: less than 0.6

Δ: 0.6–0.8

X: higher than 0.8 c) Topcoat Film Adhesion:

BASF paint (EB-70-001N, 150 mg/m$^2$/EB-69-002N, 60 mg/m$^2$) was applied to a treated metal material using a bar coater.

This painted metal material was subjected to wedge bending, and a paint peeling test was performed on the bent part by tape peeling using Nichiban Sellotape, according to the following criteria.

◯: Tape peeling width less than 15 mm

Δ: Tape peeling width 15–20 mm

X: Tape peeling width exceeds 20 mm.

d) Anti-retort Properties

A metal material which had been surface treated by the composition of this example and comparative example was left in steam at 125° C. for 30 minutes using an autoclave, and its external appearance was then evaluated according to the following criteria.

○: No change in external appearance

Δ: Slight whitening

X: Marked whitening

Herein, the term anti-retort properties refers to whitening in food cans (aluminum cans) when an unpainted substrate is treated with steam under pressure to perform sterilization.

(3) Metal Surface Treatment Conditions:

(Example 1)

After degreasing an Al-Mn (JIS-A3004) molded can at 75° C. for 60 seconds using an acid degreaser ("Surf Cleaner NHC250", Nippon Paint Co., Ltd.) at 30 g/l concentration under spray conditions, the can was rinsed in water. Next, the water-soluble acrylic resin shown in Table 1 was dissolved at a concentration of 0.5 g/l in a solution obtained by diluting zirconium phosphate ("ALSURF 440", Nippon Paint Co., Ltd.) to 20 g/l, thereby obtaining the metal surface treatment composition of this invention. Spray treatment was carried out using this composition at 50° C. for 20 seconds. The treated surface was rinsed in tap water, and heat-dried at 190° C. for 2 minutes.

The evaluation results are shown in Table 3.

TABLE 1

Water-soluble acrylic resin

| Type of copolymer weight | Ratio of copolymerized monomers (by weight) | Molecular weight (Mn) |
|---|---|---|
| A-1 NVP/DMAPAA/NBA | 60/20/20 | 3000 |
| A-2 NVP/DMAEA/ST | 50/30/20 | 6000 |
| A-3 NVP/DMAPMA/EHA/HEA | 30/30/30/10 | 4000 |
| A-4 VIZ/DMAAm/LMA | 40/30/30 | 5000 |
| A-5 VP/DMAAm/EHA | 30/40/30 | 3000 |
| B-1 HEA/NBA | 80/20 | 8000 |
| B-2 HEMA/DMAPMA | 80/20 | 4000 |

Note:
NVP: N-vinyl pyrrolidine
VIZ: N-vinyl imidazole
VP: vinyl pyridine
DMAEA: N,N-dimethylaminoethylacrylate
DMAPAA: N,N-dimethylaminopropylacrylamide
DMAPMA: N,N-dimethylaminopropylmethacrylamide
DMAAm: N,N-dimethylacrylamide
NBA: n-butyl acrylate
ST: styrene
EHA: 2-ethylhexylacrylate
LMA: lauryl methacrylate
HEA: 2-hydroxyethylacrylate

TABLE 2

| | | Water-soluble acrylic resin | | Heavy metal compound | |
|---|---|---|---|---|---|
| | | Type | Content(g/l) | Type | Content(g/l) |
| Example | 1 | A-1 | 0.5 | ALSURF 440 | 20 |
| | 2 | A-2 | 0.1 | ALSURF 440 | 20 |
| | 3 | A-3 | 1.0 | ALSURF 440 | 20 |
| | 4 | A-4 | 0.5 | ALSURF 440 | 20 |
| | 5 | A-5 | 0.5 | ALSURF 440 | 20 |

TABLE 2-continued

| | | Water-soluble acrylic resin | | Heavy metal compound | |
|---|---|---|---|---|---|
| | | Type | Content(g/l) | Type | Content(g/l) |
| | 6 | A-1 | 0.5 | $(NH_4)_2ZrF_6$ | 1 |
| | 7 | A-1 | 5.0 | ALSURF 440 | 20 |
| Comparative | 1 | B-1 | 0.5 | ALSURF 440 | 20 |
| Example | 2 | B-2 | 0.5 | ALSURF 440 | 20 |
| | 3 | — | — | ALSURF 440 | 20 |

N.B.: ALSURF 440; zirconium phosphate treatment agent, Nippon Paint Co., Ltd.

TABLE 3

| | | Result of evaluation | | |
|---|---|---|---|---|
| | | Anti-boiling water-blackening | Slipping properties | Overcoated coating adherence |
| Example | 1 | ○ | ○ | ○ |
| | 2 | ○ | ○ | ○ |
| | 3 | ○ | ○ | ○ |
| | 4 | ○ | ○ | ○ |
| | 5 | ○ | ○ | ○ |
| | 6 | ○ | ○ | ○ |
| | 7 | ○ | ○ | ○ |
| Comparative | 1 | X | X | X |
| Example | 2 | ○ | X | Δ |
| | 3 | ○ | X | X |

(Examples 2–7 and Comparative Examples 1–3)

In Examples 2–7 and Comparative Examples 1–3, a surface treatment was applied as described in the above Example 1, using metal surface treatment compositions prepared by blending the water-soluble acrylic resins shown in Table 1 with a complex fluoride of a heavy metal in the blending ratios shown in Table 2. The evaluation results are shown in Table 3.

From the above results, it is clear that tolerance to blackening on contact with boiling water, slip properties and topcoat film adhesion of the metal surface treatment composition of this invention are superior than in the case of a prior art composition.

(Examples 8–11)

In Examples 8–11, a surface treatment was applied as described in the above Example 1, using metal surface treatment compositions prepared by blending the water-soluble acrylic resins shown in Table 4 with a complex fluoride of a heavy metal in the blending ratios shown in Table 5. The evaluation results are shown in Table 6.

TABLE 4

| | Type of Copolymer | Coplymerization Ratio | Molecular Weight (Mn) |
|---|---|---|---|
| | Water-Soluble Acrylic Resin | | |
| A-6 | NVP/DMAPMA/LMA/MAA | 30/20/30/20 | 4000 |
| A-7 | NVP/DMAEA/SMA/AA | 30/20/40/10 | 5000 |
| A-8 | NVP/DMAPMA/LMA/MAA | 20/15/25/40 | 3000 |
| A-9 | VIZ/DMAAm/EHA/NPGDM | 40/20/35/5 | 4000 |

N.B.) MAA: methacrylic acid
AA: acrylic acid
NPGDM: neopentyl glycol dimethacrylate
SMA: stearyl methacrylate Other abbreviations are the same as those in the Note to Table 1.

TABLE 5

| | | Water-Soluble Acrylic resin | | Heavy Metal Compond | |
|---|---|---|---|---|---|
| | | Type | Content (g/l) | Type | Content (g/l) |
| Example | 8 | A-6 | 0.5 | ALSURF 440 | 20 |
| | 9 | A-7 | 0.5 | ALSURF 440 | 20 |
| | 10 | A-8 | 0.5 | ALSURF 440 | 20 |
| | 11 | A-9 | 0.5 | ALSURF 440 | 20 |

TABLE 6

| | | Evaluation Results | | | |
|---|---|---|---|---|---|
| | | Tolerance to Blackening | Slip Properties | Topcoat Adhesion | Anti-Retort Property |
| Example | 8 | ○ | ○ | ○ | ○ |
| | 9 | ○ | ○ | ○ | ○ |
| | 10 | ○ | ○ | ○ | ○ |
| | 11 | ○ | ○ | ○ | ○ |

From these results, it is clear that, in addition to the aforementioned properties, anti-retort properties are superior in the case of the metal surface treatment composition, and in particular, acid monomers and/or poly-functional cross-linking monomers.

Industrial Application

According to the metal surface treatment composition of this invention, permeability is suppressed by an inorganic film comprising a heavy metal or one of its salts, so corrosion resistance improves.

The amino group (ammonium group) in the acrylic resin is coordinated with the (heavy) metal, and the aforesaid inorganic film is connected via the acrylic resin. Consequently, cohesive failure of the inorganic film is prevented, and an almost uniform substrate film is formed on the metal surface. This leads to improved adhesion between the substrate film and the topcoat. Herein, the substrate film refers to a film comprising the aforesaid inorganic film which is connected via the acrylic resin formed on the metal surface. Further, as the aforesaid acrylic resin is almost uniformly distributed on the surface of the substrate film, frictional resistance is lowered, and slip properties are improved.

Therefore, according to the metal surface treatment composition of this invention, corrosion resistance and film adhesion are remarkably improved compared with the prior art, and slip properties are also conferred.

Moreover, according to the metal surface treatment composition of this invention, when food cans are manufactured using aluminum or its alloys, jamming is prevented, and lubricity is conferred on coil coatings.

The metal surface treatment composition of this invention can be used for treating a variety of metal surfaces such as food cans, car bodies, coil coatings for steel plates and construction materials.

What is claimed is:

1. An aluminum surface treatment method comprising:

bringing an acrylic resin-containing metal surface treatment composition in contact with the surface of a food can material comprising aluminum or an aluminum alloy, wherein said acrylic resin-containing metal surface treatment composition comprises (a) a water-soluble, water-dispersible or emulsifiable acrylic resin comprising (i) a heterocyclic ring containing at least one nitrogen atom, (ii) at least one of an amino group and an ammonium group and (iii) a hydrophobic group, and (b) at least one heavy metal selected from the group consisting of zirconium, molybdenum, tungsten, niobium, nickel, cobalt, manganese and tantalum, and the salts of these heavy metals, rinsing the surface of the material with water, and drying the surface of the material.

2. An aluminum surface treatment method as defined in claim 1, wherein the acrylic resin-containing metal surface treatment composition comprises a N-heterocyclic ring, in which said amino group or ammonium group in said acrylic resin comprises at least the structural unit represented by the following chemical formulae (I) or (II):

(I)

where $R_1$, $R_2$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, (II)

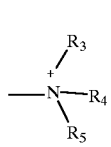

where $R_3$, $R_4$, $R_5$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, is brought in contact with the surface of the food can material comprising aluminum or an aluminum alloy, the surface of the material is rinsed with water, and the surface of the material is dried.

3. An aluminum surface treatment method as defined in claim 1, wherein the metal surface treatment composition containing an acrylic resin comprises a N-heterocyclic ring, in which the amino group or ammonium group is introduced by copolymerization of a monomer comprising at least the structural unit represented by the following chemical formulae (III) or (IV):

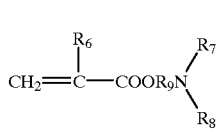

(III)

where $R_6$ is hydrogen or methyl, $R_7$, $R_8$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, and $R_9$ is an alkylene group comprising 1–5 carbon atoms,

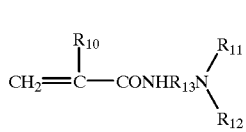

(IV)

where $R_{10}$ is hydrogen or methyl, $R_{11}$, $R_{12}$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, and $R_{13}$ is an alkylene group comprising 1–5 carbon atoms, and is brought in contact with the surface of the food can material comprising aluminum or an aluminum alloy, the surface of the material is rinsed with water, and the surface of the material is dried.

4. An aluminum surface treatment method as defined in claim 1, wherein the metal surface treatment composition containing an acrylic resin comprises a N-heterocyclic ring in which the hydrophobic group is introduced by copolymerization of a monomer comprising at least the structural unit represented by the following chemical formula (V):

(V)

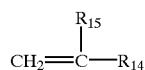

where $R_{14}$ is —$COOR_{16}$, or a substituted or unsubstituted phenyl group, and $R_{15}$ is hydrogen or methyl, and $R_{16}$ is a straight chain, branched or cyclic alkyl group comprising 4–18 carbon atoms, and $R_{15}$ is hydrogen or methyl, a is brought in contact with the surface of the food can material comprising aluminum or an aluminum alloy, the surface of the material is rinsed with water, and the surface of the material is dried.

5. A metal surface treatment method as defined in claim 1, wherein the metal surface treatment composition containing an acrylic resin comprises a N-heterocyclic ring, in which said acrylic resin further contains at least one polymerized component selected from acidic monomers comprising acrylic acid and methacrylic acid, and polyfunctional cross-linked monomers, and is brought in contact with the surface of the food can material comprising aluminum or an aluminum alloy, the surface of the material is rinsed with water, and the surface of the material is dried .

6. An aluminum surface treatment method as defined in claim 1, wherein the metal surface treatment composition containing an acrylic resin comprises a N-heterocyclic ring in which the monomer comprising the N-heterocyclic ring is at least one compound selected from N-vinyl pyrrolidine, N-vinyl caprolactam, N-vinyl imidazole and vinyl pyridine, is brought in contact with the surface of the food can material comprising aluminum or an aluminum alloy, the surface of the material is rinsed with water, and the surface of the material is dried.

7. An aluminum surface treatment method as defined in claim 1, wherein the metal surface treatment composition containing an acrylic resin comprises a N-heterocyclic ring as defined in claim 1, in which the molecular weight of acrylic resin is 500–100,000, and is brought in contact with the surface of the food can material comprising aluminum or an aluminum alloy, the surface of the material is rinsed with water, and the surface of the material is dried.

8. An aluminum surface treatment method as defined in claim 1, wherein the metal surface treatment composition containing an acrylic resin comprises a N-heterocyclic ring, in which the acrylic resin content relative to said metal surface treatment composition is 0.01–10 g/l, and is brought in contact with the surface of a food can material comprising aluminum or an aluminum alloy, the surface of the material is rinsed with water, and the surface of the material is dried.

9. An aluminum surface treatment method as defined in claim 1, wherein the metal surface treatment composition containing an acrylic resin comprises a N-heterocyclic ring, in which acrylic resin content relative to said metal surface treatment composition is 0.1–5 g/l, and is brought in contact with the surface of a food can material using aluminum or an aluminum alloy, the surface of the material is rinsed with water, and the surface of the material is dried.

10. An aluminum surface treatment method as defined in claim 1, wherein the metal surface treatment composition containing an acrylic resin comprises a N-heterocyclic ring in which copolymerization ratios of monomers of the acrylic resin are 5–60 parts by weight of amino or ammonium group-containing acrylic monomer, 20–80 parts by weight of N-heterocyclic ring-containing monomer, 5–50 parts by weight of hydrophobic group-containing monomer, and 0–60 parts by weight of other monomers, and is brought in contact with the surface of a food can material using aluminum or an aluminum alloy, the surface of the material is rinsed with water, and the surface of the material is dried.

11. An aluminum surface treatment method as defined in claim 1, wherein the metal surface treatment composition containing an acrylic resin comprises a N-heterocyclic ring in which copolymerization ratios of monomers of the acrylic resin are 20–40 parts by weight of amino or ammonium group-containing acrylic monomer, 30–60 parts by weight of N-heterocyclic ring-containing monomer and 0–40 parts by weight of hydrophobic group-containing monomer, and is brought in contact with the surface of the food can material comprising aluminum or an aluminum alloy, the surface of the material is rinsed with water, and the surface of the material is dried.

12. An aluminum surface treatment method as defined in claim 1, wherein the metal surface treatment composition containing an acrylic resin comprises a N-heterocyclic ring in which the heavy metal is at least one metal selected from the group consisting of zirconium, niobium, manganese and tantalum, and is brought in contact with the surface of the food can material comprising aluminum or an aluminum alloy, the surface of the material is rinsed with water, and the surface of the material is dried.

13. An aluminum surface treatment method as defined in claim 1, wherein the metal surface treatment composition containing an acrylic resin comprises a N-heterocyclic ring in which the source of said heavy metal is at least one of a complex fluoride, nitrate or phosphate of said heavy metal, and is brought in contact with the surface of the food can material comprising aluminum or an aluminum alloy, the surface of the material is rinsed with water, and the surface of the material is dried.

14. An aluminum surface treatment method as defined in claim 1, wherein the metal surface treatment composition containing an acrylic resin comprises a N-heterocyclic ring and said heavy metal, wherein said heavy metal is a complex fluoride, the heavy metal complex fluoride having a concentration of 0.01–10 g/l relative to said metal surface treatment composition, and is brought in contact with the surface of the food can material comprising aluminum or an aluminum alloy, the surface of the material is rinsed with water, and the surface of the material is dried.

15. An aluminum surface treatment method as defined in claim 1, wherein the metal surface treatment composition containing an acrylic resin comprises a N-heterocyclic ring, and further comprises at least one of phosphoric acid and a phosphate, and is brought in contact with the surface of the food can material comprising aluminum or an aluminum alloy, the surface of the material is rinsed with water, and the surface of the material is dried.

16. An aluminum surface treatment method as defined in claim 15, wherein the metal surface treatment composition containing an acrylic resin comprises a N-heterocyclic ring in which said at least one of phosphoric acid and a phosphate is at least one of $H_3PO_4$, $Na_3PO_4$, $Na_2HPO_4$, $NaH_2PO_4$ or $(NH_4)_3PO_4$, and is brought in contact with the surface of the food can material comprising aluminum or an aluminum alloy, the surface of the material is rinsed with water, and the surface of the material is dried.

17. An aluminum surface treatment method as defined in claim 15, wherein the metal surface treatment composition containing an acrylic resin comprises a N-heterocyclic ring in which the content of the at least one of phosphoric acid and a phosphate is 0.01–20 g/l relative to said metal surface treatment composition, and is brought in contact with the surface of the food can material comprising aluminum or an aluminum alloy, the surface of the material is rinsed with water, and the surface of the material is dried.

18. An aluminum surface treatment method as defined in claim 1, wherein the metal surface treatment composition containing an acrylic resin comprises a N-heterocyclic ring and further comprises an etchant, and is brought in contact with the surface of the food can material comprising aluminum or an aluminum alloy, the surface of the material is rinsed with water, and the surface of the material is dried.

19. An aluminum surface treatment method as defined in claim 18, wherein the metal surface treatment composition containing an acrylic resin comprises a N-heterocyclic ring in which said etchant is at least one of hydrogen fluoride and a salt of hydrogen fluoride, and is brought in contact with the surface of the food can material comprising aluminum or an aluminum alloy, the surface of the material is rinsed with water, and the surface of the material is dried.

20. An aluminum surface treatment method as defined in claim 18, wherein the metal surface treatment composition containing an acrylic resin comprises a N-heterocyclic ring in which the etchant content is 0.005–5 g/l relative to the metal surface treatment composition, and is brought in contact with the surface of the food can material comprising aluminum or an aluminum alloy, the surface of the material is rinsed with water, and the surface of the material is dried.

21. An aluminum surface treatment method as defined in claim 1, wherein the acrylic-resin containing metal surface treatment composition further comprises an etching assistant, and is brought in contact with the surface of the food can material comprising aluminum or an aluminum alloy, the surface of the material is rinsed with water, and the surface of the material is dried.

22. An aluminum surface treatment method as defined in claim 21, wherein the metal surface treatment composition containing an acrylic resin comprises a N-heterocyclic ring in which said etching assistant is at least one member selected from the group consisting of hydrogen peroxide, nitrous acid, a nitrous acid salt, $HBF_4$ and a $HBF_4$ salt, and is brought in contact with the surface of the food can material comprising aluminum or aluminum alloy, the surface of the material is rinsed with water, and the surface of the material is dried.

23. An aluminum surface treatment method as defined in claim 22, wherein the metal surface treatment composition containing an acrylic resin comprises a N-heterocyclic ring in which the at least one of hydrogen peroxide, nitrous acid and nitrous acid salt is included in a content of 0.005–5 g/l relative to said metal surface treatment composition, and is brought in contact with the surface of the food can material comprising aluminum or an aluminum alloy, the surface of the material is rinsed with water, and the surface of the material is dried.

24. An aluminum surface treatment method as defined in claim 22, wherein the metal surface treatment composition containing an acrylic resin comprises a N-heterocyclic ring including $HBF_4$ or $HBF_4$ salt in a content of 0.003–0.2 g/l relative to the metal surface treatment composition, and is brought in contact with the surface of the food can material comprising aluminum or an aluminum alloy, the surface of the material is rinsed with water, and the surface of the material is dried.

25. A surface-treated aluminum material which has been treated with a metal surface treatment composition containing an acrylic resin comprising a N-heterocyclic ring as defined in claim 1.

* * * * *